Figure 1:
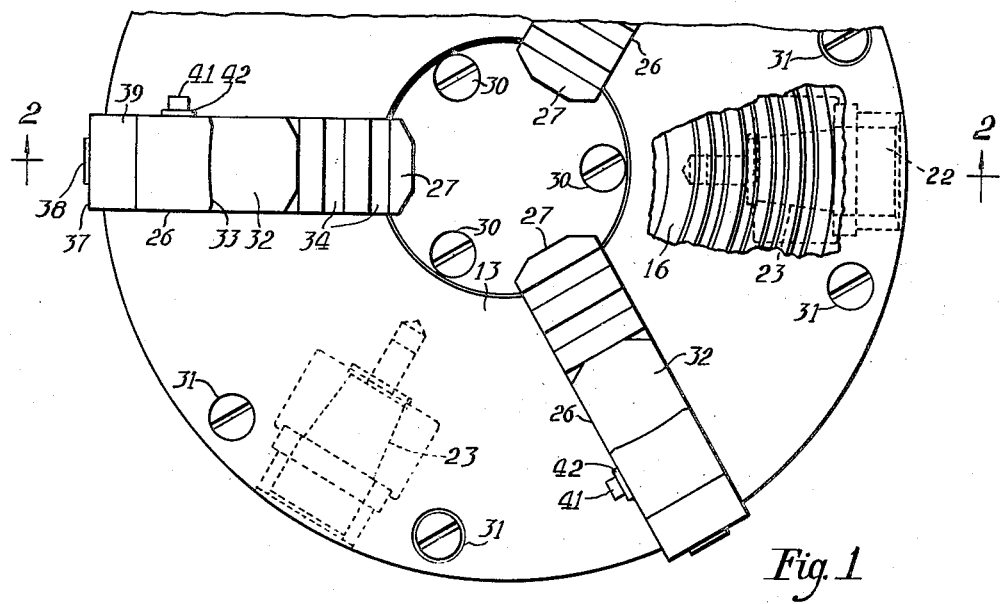

July 11, 1950     C. D. CASSIDY     2,514,472
CHUCK
Filed Dec. 18, 1944

INVENTOR
Clifford D. Cassidy
BY Paul M. Gust
ATTORNEY

Patented July 11, 1950

2,514,472

UNITED STATES PATENT OFFICE 2,514,472

CHUCK

Clifford D. Cassidy, Bridgeport, Conn., assignor to The Bullard Company, a corporation of Connecticut Application December 18, 1944, Serial No. 568,602

4 Claims. (Cl. 279—123)

This invention relates to work-supporting devices for machine tools such as lathes, and particularly to a new and improved work-chucking mechanism.

Work-chucking devices for lathes and similar machine tools usually include a spindle having reciprocable shoes to which top jaws are adapted to be adjustably mounted for rigidly gripping the work to be machined.

High-production jobs usually include a separate set of top jaws for each substantially different diameter of the work that is required to be gripped. Each of these sets is machined so that their gripping surfaces accurately conform to the diameter of the work at the point of gripping. A separate set of top jaws is required for each substantially different diameter to be gripped because any substantial radial movement of the top jaws disrupts the conformity between the gripping surface of the top jaws and the work. Certain jobs require as many as four or more different chuckings, at each of which the work may be gripped on a substantially different diameter. Additionally, a production job may include similar pieces of different dimensions and separate sets of top jaws would be provided for each substantially different gripping diameter of the similar pieces. In production work in particular, therefore, a great many sets of top jaws may be provided that require quick change-over at periodic intervals.

Prior-known chucking constructions usually employ a plurality of screws for each top jaw arranged in counterbored openings so as not to interfere with the work to be chucked. These screws are arranged to provide maximum rigidity between the shoe and top jaw, and are usually disposed radially of the chuck on which the shoes and jaws are mounted. Where the chuck seat is in a horizontal plane, these counterbored holes fill with chips from the work being machined, requiring much time to remove the chips prior to removing the top jaws from the shoes.

In multiple spindle lathes, when as many as twelve chucks may be employed, and each chuck includes at least three top jaws, a change-over of the top jaws will involve the cleaning of at least two holes for each of as many as thirty-six top jaws and the loosening and tightening of seventy-two screws. The time involved in such a change-over adds materially to the cost of a job and often exceeds the time of actual machining for which the change-over was required.

The principal object of this invention is to provide a work-chucking device that will overcome the above, as well as other difficulties. Other objects include the provision of a chucking device that includes top jaws that are adapted adjustably to be clamped to shoes in such a way that they can be removed with ease and facility; the provision of such a chucking mechanism in which a single adjustable element is provided to effect clamping and unclamping of a top jaw to a shoe; the provision of such a chucking mechanism in which the force incident to chucking the work always reacts directly on an integral part of the top jaws; and the provision of such a chucking mechanism in which the adjustable element is so located that it will not interfere with the work being chucked or be interfered with by the metal chips removed from the work.

Figure 2:
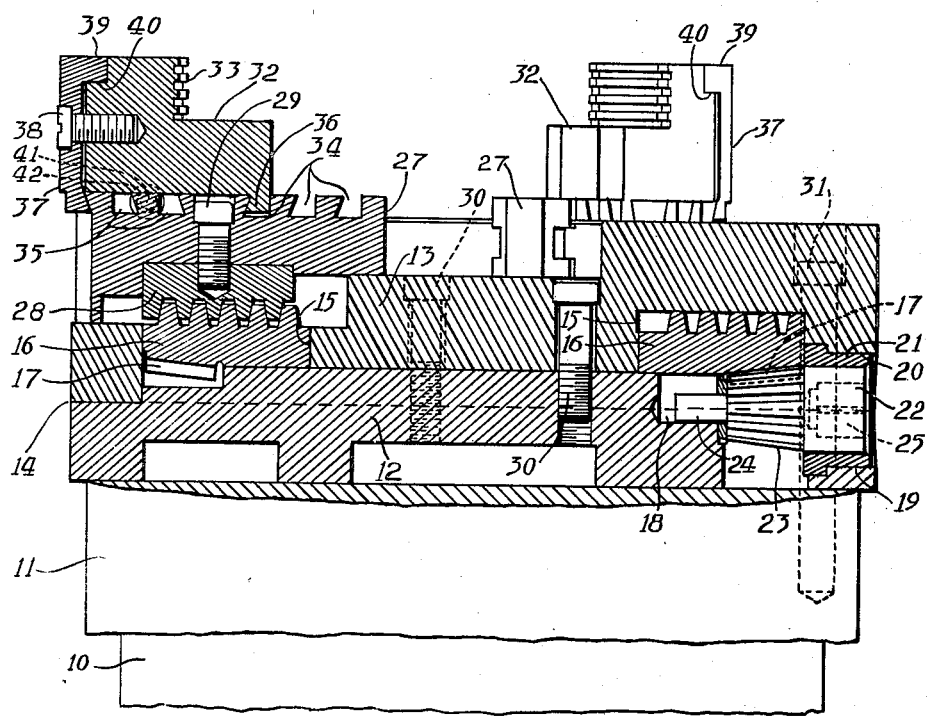

The above, as well as other objects and novel features of the invention, will become apparent from the following specification and accompanying drawing, in which Figure 1 is a top plan view of a chucking mechanism to which the principles of the invention have been applied; and Figure 2 is a sectional elevational view taken substantially along line 2—2 of Figure 1.

Referring to the drawing, the invention is shown as applied to a work-supporting chuck for a machine tool including a spindle 10 that is adapted to be journaled in plain or anti-friction bearings within the frame of a machine tool. A table 11 integral with the spindle 10 is adapted to support a frame member comprising lower and upper members 12 and 13 respectively within which the means for supporting the operating parts of the chucking device are located. The lower and upper portions 12 and 13 are rigidly held together, but are separable along a line 14 for purpose of assembly. The upper portion 13 includes an annular-shaped recess 15 within which an annular-shaped scroll ring 16 is mounted for rotation. The under surface of the scroll ring 16 includes a bevel gear 17 formed integrally therewith. The lower portion 12 of the frame member is provided with a semi-cylindrical recess 18 having parallel walls extending to the top of the lower portion 12. Another semi-cylindrical opening 19 is provided within the lower member 12, and a similar semi-cylindrical opening 20 is provided in the upper portion 13. The two semi-cylindrical portions form a cylindrical support for a bushing 21 that surrounds one trunnion 22 of a bevel pinion 23. The other trunnion 24 of the bevel pinion 23 is journaled in the semi-cylindrical opening 18. The bevel pinion 23 is adapted to mesh with the bevel gear 17 on the scroll ring 16. A square recess 25 is provided in the end of the trunnion 22 for the reception of a wrench, whereby the pinion 23 can be rotated in either direction to thereby rotate the scroll ring 16 in either direction. There are three such bevel pinions 23 spaced 120 degrees apart about the lower member 12 of the frame. The upper member 13 is provided with radially-disposed slots 26 (Fig. 1). In the present instance, three such slots 26 are provided at 120-degree intervals about the top member 13. Radially-disposed shoes 27 are located in each of the slots 26 and each includes a nut 28 fixed to the shoe 27 by screws 29. Each nut 28 cooperates with the scroll on the scroll ring 16 in such manner that upon rotation of the ring 16, shoe 27 is adapted to be moved radially relatively to the work-supporting chuck. The lower and upper portions 12 and 13 of the frame are adapted rigidly to be fixed together by screws 30. The frame itself is rigidly fixed to the table 11 by the screws 31. A top jaw 32 is provided with an arcuate gripping surface 33 that is machined to accurately conform to the diameter of the work at the point of gripping.

In the present invention, means is provided for rigidly but releasably holding the top jaw having the correct arcuate gripping surface at its correct radial position along the longitudinal axis of the shoe 27. Supporting means for top jaws 32, in the instant disclosure, take the form of shoes 27. These shoes are provided with a plurality of transverse slots 34, each having a semi-dovetail wall construction, and a plurality of slots 35 of similar construction. The construction and arrangement are such that the slots 34 cooperate with slots 35 to provide one portion of a dove-tail clamping means. Each top jaw 32 includes an integral depending clamping element 36 adapted to slide into the slots 34 transversely of the shoe 27. One side of element 36 is provided with a semi-dovetail surface adapted to cooperate with the semi-dovetail surface of the slots 34. A clamping member 37 is adapted adjustably to be connected to each of the top jaws 32 by a single screw 38. The upper portion of the clamping member 37 includes a flange 39 that overlies a shoulder 40 on the top jaw 32. The lower end of the clamp member 37 includes a semi-dovetail surface adapted to cooperate with a corresponding semi-dovetail surface on the outer end of the shoe 27, as well as with similar semi-dovetail surfaces of the slots 35. A screw 41 (Fig. 1) is adapted to hold a washer 42 on the one side of each shoe 27 to insure proper circumferential positioning of the top jaws during setup. Referring to Fig. 2, the construction and arrangement of the parts are such that to change over from the top jaw 32 shown, to one that calls for a different location from that shown in Fig. 2, it is only necessary to loosen screw 38 and to shift the top jaw 32 transversely of the shoe 27 away from washer 42 until the jaw 32 separates therefrom. The new top jaw 32, having a different arcuate gripping surface 33 may then be slid transversely of the shoe 27 at its correct radial location such that the depending portion 36 of the top jaw slides within the correct groove 34; the lower portion of the clamp 37 slides within the correct groove 35; and the one side of the jaw 32 engages washer 42. The screw 38 on the new top jaw may then be tightened to effectively clamp the jaw to the shoe 27.

The construction employed is particularly advantageous since the reaction from the work being clamped is at all times transmitted directly to the depending portion 36 integral with the top jaw 32 and does not react on the threads of the screw 38.

Although the various features of the improved chuck have been shown and described in detail to fully disclose one embodiment of the invention, it will be evident that numerous changes may be made in such details, and certain features may be used without others, without departing from the principles of the invention.

What is claimed is:

1. A chuck jaw assembly including a support; a set of equally-spaced transverse grooves on each side of the transverse center line of said support; each of the grooves of one set having an inclined transverse binding surface opposed to a similar surface in each groove of the other set, said opposed surfaces diverging outwardly; a top jaw having a single integral binding projection, of a width less than the width of said transverse grooves and a mating surface for the inclined surface of said grooves; a binder separate from said top jaw including a portion having a thickness less than the width of said grooves and a mating surface for the inclined surfaces thereof; and a bolt extending through said binder and into said top jaw to draw said top jaw and binder toward each other.

2. A chuck jaw assembly including a support; a set of equally-spaced transverse grooves on each side of the transverse center line of said support; each of the grooves of one set having an inclined transverse binding surface opposed to a similar surface in each groove of the other set, said opposed surfaces diverging outwardly; a top jaw having a single integral binding projection, of a width less than the width of said transverse grooves and a mating surface for the inclined surface of said grooves; a binder separate from said top jaw including a portion having a thickness less than the width of said grooves and a mating surface for the inclined surfaces thereof; means for locating said top jaw transversely of said support; and means for drawing said binder and top jaw toward each other such that said portion and binding projection interlock with said opposed grooves in said support.

3. A chuck jaw assembly including a support; a set of equally-spaced straight line transverse grooves on each side of the transverse center line of said support, each of the grooves of one set having an inclined transverse binding surface opposed to a similar surface in each groove of the other set, said opposed surfaces diverging outwardly; a top jaw having a single integral binding projection, of a width less than the width of said transverse grooves and a straight line transverse mating surface for the inclined surface of said grooves; a binder separate from said top jaw including a portion having a thickness less than the width of said grooves and a straight line mating surface for the inclined surfaces thereof; and means extending through said binder and into said top jaw to draw said top jaw and binder toward each other.

4. A chuck jaw assembly including a support; a set of equally-spaced straight line transverse grooves on each side of the transverse center line of said support, each of the grooves of one set having an inclined transverse binding surface opposed to a similar surface in each groove of the other set, said opposed surfaces diverging outwardly; a top jaw having a single integral binding projection, of a width less than the width of said transverse grooves and a straight line transverse mating surface for the inclined surface of said grooves; a binder separate from said top jaw including a portion having a thickness less than the width of said grooves and a straight line mating surface for the inclined surfaces thereof; means for locating said top jaw transversely of said support; and means for drawing said binder and top jaw toward each other such that said portion and binding projection interlock with said opposed grooves in said support.

CLIFFORD D. CASSIDY.

REFERENCES CITED

The following references are of record in the file of this patent:

UNITED STATES PATENTS

| Number | Name | Date |
|---|---|---|
| 414,955 | Sweetland | Nov. 12, 1889 |

FOREIGN PATENTS

| Number | Country | Date |
|---|---|---|
| 10,866 | Sweden | 1900 |
| 39,934 | France | 1931 |